Feb. 9, 1926.
W. LACKS ET AL
1,572,610
BRACKET HOLDER FOR JUNCTION BOXES
Filed Oct. 30, 1924
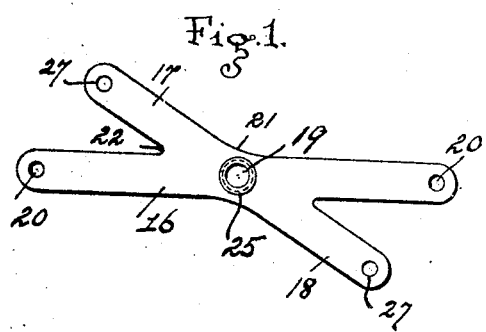
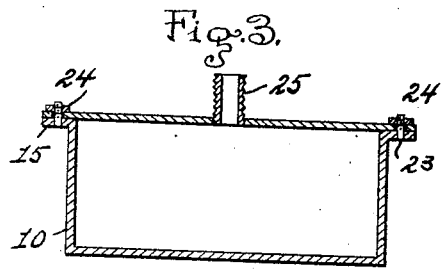
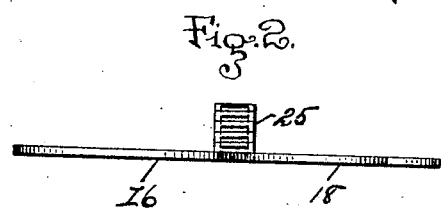
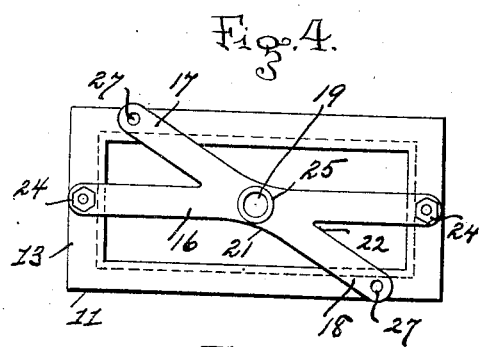
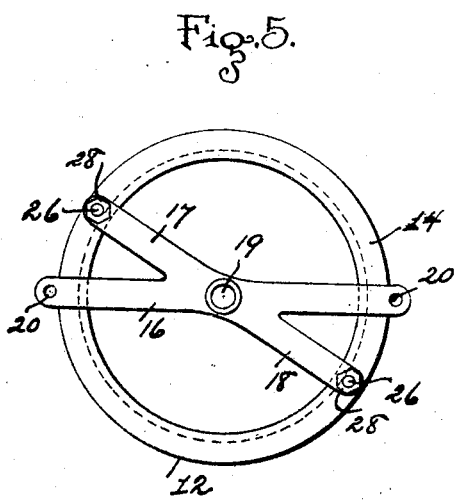
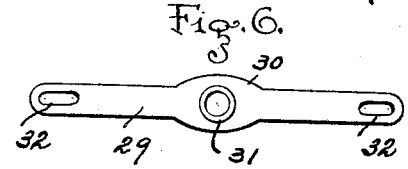
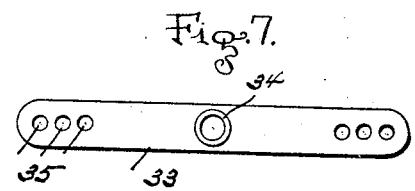
INVENTORS
William Lacks
Morris S. Newman
BY
Fred C. Fischer
ATTORNEY Patented Feb. 9, 1926.

1,572,610

UNITED STATES PATENT OFFICE.

WILLIAM LACKS AND MORRIS S. NEWMAN, OF NEWARK, NEW JERSEY.

BRACKET HOLDER FOR JUNCTION BOXES.

Application filed October 30, 1924. Serial No. 746,761.

*To all whom it may concern:*

Be it known that we, WILLIAM LACKS and MORRIS S. NEWMAN, citizens of the United States, residing at Newark, in the county of Essex and State of New Jersey, have invented new and useful Improvements in Bracket Holders for Junction Boxes, of which the following is a specification.

This invention relates to devices characterized as bracket holders for junction boxes, which latter are of the type used in the walls of buildings to receive the electric cables and to which connections are made to the wall fixtures.
Such appliances are usually formed with their major portion offset, so as to extend within the box, and therefore materially reduce the area to be utilized for the housing of the cables.
Any metal may be used in the construction of the improved bracket holder but it is preferred that some suitable spring metal be used, which may be readily stamped out upon a die press or the like.
One of the main objects of the invention is to provide bracket holders, so designed as to be completely ready for connection to junction boxes of different size and configuration.
Another purpose is to produce a bracket holder adapted for instant connection to the box and which does not utilize space therewithin.

A further aim is in the provision of means, actuated by a single stem screw, for rigidly fastening the fixture connections to the journal box bracket.

These and like other aims are accomplished by the novel construction, combination and arrangement of parts hereinafter described and illustrated in the accompanying drawing, forming a material part of this disclosure, and in which:—

Figure 1 is a top plan view of a bracket holder made in accordance with the invention.

Figure 2 is a longitudinal edge elevation illustrating the attachment of the fixture supporting stem thereto.
Figure 3 is a cross section of a square junction box and illustrates the attachment of the bracket holder and stem.

Figure 4 is a top plan view of a rectangular shaped junction, illustrating the application of the bracket holder thereto.

Figure 5 is a similar view illustrating the application of the bracket holder to a round junction box.

Figure 6 is a plan view of a modified form of the bracket holder.

Figure 7 is still another plan view illustrating a further modification.

Figure 8 is a longitudinal edge elevation of the same.

The junction boxes 10, 11 and 12 respectively, are of the generally accepted type and as here illustrated are of square, oblong and round configuration and consist of a casing formed of sheet metal, around the open ends of which are formed the outwardly directed flanges 13 and 14 and in some the flanges are dispensed with and outwardly directed lips provided as illustrated at 15 in Figure 3.

These junction boxes are set in openings provided in the walls of buildings and are adapted to receive cables or wires used as conveyors of electric currents to the lighting fixtures not disclosed.

In the preferred form of the invention, a relatively thin blank of sheet metal is struck out, to form the bracket holder illustrated in Figure 1, which consists of the horizontally extending body portion 16 from the medial point of which the arms 17 and 18 project outwardly at angles from the opposite edges thereof. The body portion 16 is formed with a centrally disposed screw threaded opening 19, while the opposite ends are provided with openings 20.

The degree of angulation of arms 16 and 17 with respect to the body portion 16 of the bracket may vary according to the configuration of the junction boxes to which they may be attached.

Likewise the metal at the intersection of the body portion 16 and the arms 17 and 18 is sheared in arcuate plane as at 21 and 22 to avoid sharp corners.

The improved bracket holders are adapted to extend across the open end of the junction box with the extremities of the body portion 16 seating upon the box flange or lips such as may be provided thereon, with the openings 20 in register with similar openings in the said flange and lip. Stub bolts 23 are passed through the openings in the flange and bracket holder and nuts 24 when adjusted serve to hold the bracket firmly upon the junction box. The arms 17 and 18 extend diagonally across the box and the extremities thereof lay flush against the upper edges of the opposite side wall of the box and serve as auxiliary supporting means for the bracket.

A hollow externally screw threaded stud 25 takes into the centrally disposed threaded opening 19 of the bracket, and an interiorly threaded knuckle not illustrated is then screwed thereon.

Cables from the junction box are passed through the hollow stud 25 and knuckle to make connection with the lamp or lamps supported by the fixtures.

Where square or rectangular junction boxes are to be connected up with the lighting fixtures, the bracket holder is placed across the longitudinal central part of the box and as the body portion of the said bracket holder is relatively of greater length than the combined length of the arms 17 and 18, the ends of the bracket holder will be secured to the opposite end walls of the box, by the stud bolts 23.

When the bracket holder is to be attached to a round box as illustrated in Figure 5, the holder is adjusted so that the arm members 17 and 18 span the smaller opening and stub bolts 26 pass through openings 27 provided in the extreme ends of the arms and take into openings in the box flange or lip. Nuts 28 are threaded upon the stub bolts 26 and serve to hold the bracket holder firmly upon the box.

While the arms 17 and 18 extend in angular plane across the open upper end of the box and have their ends screwed in the manner stated, the body proper of the bracket extends at right angles to the axis of the round box.

The outer ends of the bracket body portion lay flush against the outer edge of the box walls or flange and serves in conjunction with the arms in providing a rigid supporting means for the bracket holder.

In the modified form illustrated in Figure 6 the bracket holder 29 comprises an elongated strip of metal having an enlarged central portion 30, to receive an interiorly screw threaded stud 31. The opposite ends of bracket holder 29 are formed with slots 32 adapted to receive bolts or screws, not illustrated by means of which it may be attached to the junction box.

The slots 32 are provided so that the bracket holder 29 may be attached to boxes of different sizes and the enlarged central portion 30, reenforces the bracket holder at the point where the stud 31 is secured thereto.

The modification illustrated in Figure 7 discloses the bracket holder in the form of a strap 33, having a threaded central opening adapted for the reception of a threaded stud 34. The opposite ends of the bracket holder in this instance are formed with a series of openings 35 arranged in spaced relation. These openings 35 are provided, whereby the bracket holder may be attached to boxes of different sizes, the bolts or screws being passed through the openings which register with the proper openings in the box flange or lip as the case may be.

In this manner we have provided a bracket holder that may be fitted to junction boxes of different configuration and sizes and which will rigidly support the fixtures thereon.

Likewise, the bracket holders may be stamped out of sheet metal and are therefore economical to manufacture.

Although we have described our improvements with considerable detail and with respect to certain particular forms of our invention, we do not desire to be limited to such details since many changes and modifications may well be made without departing from the spirit and scope of our invention in its broadest aspect.

Having thus described our invention, what we claim as new and desire to secure by Letters Patent, is:—

1. A bracket holder formed of a flat plate, having a screw threaded central opening, said plate being provided with pairs of obliquely disposed arms of different length, said arms having openings in the outer ends thereof.

2. An interchangeable bracket holder for junction boxes formed of a flat plate, having a screw threaded central opening, said plate being provided with pairs of arms of different lengths, the shorter of said arms disposed in oblique relation to the longer of said arms and the said arms having openings arranged in their outer ends adapted for the reception of securing means to standard junction boxes.

This specification signed and witnessed this 28th day of October, 1924.

WILLIAM LACKS.
MORRIS S. NEWMAN.